US 6,550,663 B2

(12) United States Patent
Poletaev

(10) Patent No.: US 6,550,663 B2
(45) Date of Patent: Apr. 22, 2003

(54) DESKTOP SOLDERING DISPENSER WITH AUTOMATIC METERING AND FEEDING OF SOLDERING WIRE

(75) Inventor: Leonid Poletaev, 169 Overbrook Pl., Toronto, Ontario (CA), M3H 4R2

(73) Assignee: Leonid Poletaev, Toronto (CA)

( * ) Notice: Subject to any disclaimer, the term of this patent is extended or adjusted under 35 U.S.C. 154(b) by 0 days.

(21) Appl. No.: 09/867,499

(22) Filed: May 31, 2001

(65) Prior Publication Data

US 2002/0179680 A1 Dec. 5, 2002

(51) Int. Cl.$^7$ .................. B23K 31/00; B23Q 15/013
(52) U.S. Cl. ................... 228/102; 228/8; 228/41; 228/103; 228/247
(58) Field of Search .................. 228/105, 102, 228/103, 180.5, 4.5, 245, 246, 247, 8, 33, 41

(56) References Cited

U.S. PATENT DOCUMENTS

| 3,792,228 A | 2/1974 | Wei-Cheng | 219/230 |
|---|---|---|---|
| 3,815,843 A | 6/1974 | Fortune | 242/96 |
| 3,824,371 A | 7/1974 | Schurman, Jr. | 219/230 |
| 3,852,565 A | 12/1974 | Kager | 219/241 |
| 3,896,982 A | 7/1975 | Redman | 226/128 |
| 3,940,046 A | 2/1976 | Fern | 228/8 |
| 3,990,622 A | 11/1976 | Schurman, Jr. et al. | 228/53 |
| 4,083,268 A | 4/1978 | Kober | 81/9.5 R |
| 4,107,508 A | 8/1978 | Izumi et al. | 219/137.7 |
| 4,159,795 A * | 7/1979 | Friedman | 206/409 |
| 4,199,096 A | 4/1980 | Keefe et al. | 228/52 |
| 4,408,730 A | 10/1983 | Shend'ge et al. | 242/96 |
| 4,411,379 A | 10/1983 | Gravel | 228/52 |
| 4,412,662 A | 11/1983 | Rutecki | 242/125.3 |
| 4,418,268 A * | 11/1983 | Munshaw | 219/240 |
| 4,434,925 A | 3/1984 | Jacobs | 226/127 |
| 4,437,603 A * | 3/1984 | Kobayashi et al. | 228/105 |
| 4,493,449 A | 1/1985 | Kleiman | 228/7 |
| 4,507,545 A | 3/1985 | Riordan | 219/230 |
| 4,521,673 A | 6/1985 | Oury | 219/230 |
| 4,598,855 A * | 7/1986 | Bell et al. | 219/230 |
| 4,614,295 A | 9/1986 | Kochli | 228/53 |
| 4,688,709 A | 8/1987 | Minor | 226/128 |
| 4,690,318 A | 9/1987 | Hite | 228/57 |
| 4,746,050 A | 5/1988 | Brown | 228/57 |
| 4,793,541 A | 12/1988 | Dravnieks | 228/52 |
| 4,899,924 A | 2/1990 | Kawaguchi | 228/242 |
| 4,932,581 A | 6/1990 | Ohle et al. | 228/102 |
| 4,944,464 A | 7/1990 | Zelenka | 242/54 |
| 5,031,817 A | 7/1991 | Chen | 228/20 |
| 5,122,635 A * | 6/1992 | Knodler et al. | 219/121.63 |
| 5,155,332 A | 10/1992 | Maguire | 219/137.2 |
| 5,261,590 A | 11/1993 | Tsai | 228/41 |

(List continued on next page.)

FOREIGN PATENT DOCUMENTS

| DE | 2621780 A1 | * 12/1977 |
| DE | 3939812 C2 | * 11/1993 |
| EP | 0546781 A1 | * 6/1993 |
| EP | 0838297 A1 | * 4/1998 |
| GB | 1201188 A | * 8/1970 |
| GB | 2095210 A | * 9/1982 |

OTHER PUBLICATIONS

WO 01/89753 A1 Radeck (Nov. 29, 2001).*

Primary Examiner—Tom Dunn
Assistant Examiner—Kiley Stoner
(74) Attorney, Agent, or Firm—Neil H. Hughes; Ivor M. Hughes; Marcelo K. Sarkis

(57) ABSTRACT

The present invention describes the precise metering of soldering material realized in a preferred desktop preferably portable device designated for hand-soldering in small and medium volume operations. It combines the fully automated process of precise metering of the soldering wire for high accuracy and quality soldering with the freedom of a hand-operated soldering process.

22 Claims, 8 Drawing Sheets

U.S. PATENT DOCUMENTS

| | | | |
|---|---|---|---|
| 5,379,941 A | 1/1995 | Partel | 228/33 |
| 5,415,338 A | 5/1995 | Wilkes | 228/244 |
| 5,421,504 A * | 6/1995 | Spirig | 226/158 |
| 5,421,505 A | 6/1995 | Hild, II | 228/41 |
| 5,421,514 A | 6/1995 | Spirig | 228/41 |
| 5,579,669 A | 12/1996 | Kind et al. | 83/13 |
| 5,782,394 A | 7/1998 | Langley | 226/187 |
| 5,813,591 A | 9/1998 | Quinn et al. | 228/41 |
| 5,839,642 A | 11/1998 | Tait | 228/41 |
| 5,998,758 A | 12/1999 | Moser et al. | 219/121.63 |
| 6,027,068 A | 2/2000 | Lantsman | 242/564.4 |
| 6,369,359 B1 * | 4/2002 | Morrison | 219/229 |

* cited by examiner

DESKTOP SOLDERING DISPENSER WITH AUTOMATIC METERING AND FEEDING OF SOLDERING WIRE

FIELD OF THE INVENTION

The invention relates to a preferred desktop device for automatic delivery of a metered quantity of soldering wire in accordance with settings of an operator.

BACKGROUND OF THE INVENTION

As it is well known, there are several groups of inventions related to the metering and delivering of a soldering material. The first group represents various types of dispensers of soldering material (wire), which are designated to provide the operator with portions of this material (U.S. Pat. Nos. 3,815,843, 4,690,318, 4,688,709, 4,408,730, 5,421,505 etc.). The devices vary greatly in their design; however, most of these devices are hand-held and require the continual use of one of the operator's hands. One exception is a device described in U.S. Pat. No. 4,690,318, where instead of a hand-held dispenser, the operator has the feeding tube mounted on a head-worn device.

The second group of inventions comprises different types of soldering dispensers joined with a soldering gun or soldering iron for hand soldering operations. Very often such devices have some kind of a metering mechanism for soldering wire (U.S. Pat. Nos. 3,792,228, 3,824,371, 3,852,565, 3,990,622, 4,199,096, 4,411,379, 4,521,673, 4,614,295, 4,793,541, 5,379,941 etc.). It is quite obvious that a soldering dispenser makes a soldering gun or soldering iron heavier and deprives the soldering process of its simplicity and flexibility.

The third group of inventions relates to the methods and devices for automatic soldering process that involves delivering the soldering material to a soldering area. The devices comprise, as a rule, in addition to the first two groups, more sophisticated automatic mechanisms for feeding and metering of the soldering wire to a soldering location (U.S. Pat. Nos. 4,932,581, 5,261,590 etc.). The application of such devices allows for sufficient improvement of the soldering process, making it semiautomatic. However, the complexity of such soldering devices makes them applicable mostly for medium- and high-volume production only.

None of the inventions described above sufficiently increase the accuracy and quality of a hand-soldering process without significantly adding to the tasks required of the operator.

When preparing a soldered joint and particularly for fixing elements to a printed circuit board, the operator is required to follow the standards set out in the soldering handbook. It is important to use a sufficient amount of soldering material for fastening the component in question, or the wires to the circuit board. If insufficient amounts of soldering are utilized then the connection may not be complete. If excessive amounts of soldering are utilized then the connection will be excessive according to standards and will be more than likely refused by quality control for re-work which results in of course the expense of re-working. It is therefore advantageous to provide a precise amount of solder to the operator for the job in question.

Heretofore, the determination of the precise amount is left to the skill of the operator. There are many devices in the prior art which address providing soldering material to the operator. However, it is left up to the operator for the most part to determine exactly how much solder he will deposit on the tip of the soldering iron or the tool for each job to be done. Due to human error this amount is not accurately reproducible.

One particular reference in the art teaches marking the soldering material as it is advanced toward the operator so that the soldering material is separated by these marks into segments. The operator can then determine how many segments he needs for each job. This is an improvement over leaving the amount of solder selected to the skill of the operator, however it is insufficient, in view of the fact that the skill of operators varies. It difficult to acquire the services of skilled technicians that have the experience to place only precise amounts of soldering material on the tip of the iron.

Applicant has recently learned that JBC Industries S.A. has a product in development Model AL 2500 EU Ref. 2500200 according to their web site which alleges to define the length of soldering wire, the feed speed thereof and purporting to have an automatic cycle. No further details are known at this time. It is difficult to reach any conclusions in this regard.

The primary object of the invention is to provide a hand-soldering operator with a method a and a device which has the following advantages:

Sufficiently improves the quality of a hand-soldering process, particularly in the case of repetitive or similar soldering operation, by providing an operator with a precise dosage of soldering material.

Frees the hands of an operator from the customary periodic pulling of a soldering wire during soldering, thereby leaving the operator free to manipulate the soldering iron and to position and carefully hold an electronic component in position or the like.

Reduces the time of soldering.

Reduces the qualification and skill required from a hand-soldering operator for the same type of operation.

Reduces consumption of soldering material.

Provides a preferred portable desktop sized device.

Provides for use of soldering wire of different diameters.

It would therefore be advantageous to provide such a device that will measure a precise amount of soldering material of variable diameters to the technician in a simple device which is easy to use and ergonomically friendly.

Further and other objects of the invention will become apparent to those skilled in the art when considering the following summary of the invention, and the more detailed description of the preferred embodiments illustrated herein.

SUMMARY OF THE INVENTION

The present invention describes the precise metering of soldering material realized in a preferred desktop preferably portable device designated for hand-soldering in small and medium volume operations. It combines the fully automated process of precise metering of the soldering wire for high accuracy and quality soldering with the freedom of a hand-operated soldering process.

According to a primary aspect of the invention there is therefore provided a device for metering a precise dose of soldering material to an operator, said device comprising a controller for controlling a supply of at least one continuous length of soldering material, preferably disposed in a coil and preferably on a spool, said device having at least one soldering material passage and preferably a channel for feeding a supply of at least one continuous length of soldering material to the operator, said passage and preferred channel having drive means disposed adjacent thereto for driving the continuous filament of material from the supply through said passage towards the technician, preferably said drive means being either a, preferred electric, motor or a stepped motor capable of being driven in stepped increments, said passage further having in association therewith at least one sensor and preferably at least one optical sensor for monitoring the position of the free end of said supply of at least one continuous length of soldering material, and in a preferred embodiment having three optical sensors disposed adjacent said passage and the preferred channel for sensing, the position of the free end of said supply of at least one continuous length of soldering material, the amount to be supplied to the operator, and for sensing when the supply of at least one continuous length of soldering material is depleted, and in one embodiment also for determining the feed rate for the soldering material, said soldering material exiting said passage and preferred channel proximate a mouth adjacent a convenient position for a technician and preferably having a preferably Teflon® coated surface and preferred notch adjacent said mouth to provide heat resistance to the tip of a soldering tool, preferably said device also having a sensor adjacent the mouth for determining when a soldering tool tip has acquired a dose of soldering material, and preferably being a pyroelectric infrared motion sensor which detects the heat of the tool and based on a predetermined time delay will provide feedback to a device controller and preferably a microprocessor to the activate the drive means to provide a second dose of soldering material, said feedback may alternatively be an electronic sensor to sense an electrical condition such as a positive charge or a grounding condition when the tip acquires the precise predetermined dose, preferably said electrical sensor being a chip including at least one transistor which changes electrical state based on the soldering tool tip touching the soldering material, said device having said controller and the preferred microprocessor in communication with said sensors and for measuring the dose advanced to the operator by in one embodiment stepping the motor a predetermined amount to advance the predetermined dose or in another embodiment calculating the time required for the filament to be advanced by the fixed speed motor from the sensor sensing the free end of the soldering filament to the sensor adjacent the mouth of the device thereby determining the time the motor must operate preferably by considering the fixed distance between the sensors and the velocity of feed of the soldering material thereby determining the time and by advancing the motor a predetermined amount defined by an operator selectable setting, said device also having a technician or operator dose selecting means, for a precise dose range (automatic setting range) depending on the job being done, and preferably in addition a second range for a fixed amount of material (manual setting range) to be advanced to the technician which based on the skill of the operator may only be partially consumed, wherein said device provides to the operator an automatic hands free ergonomically friendly manner of acquiring a precise dose or fixed amount of soldering material of various diameters for the job to be done. Preferably said device being a portable or alternatively a desk top device which may be located proximate the operator.

In the preferred embodiment of the invention the above-mentioned device may be provided as a compact automatic desktop soldering device with a preferably plastic case preferably manufactured from electrostatic discharged (ESD) material, said case having two compartments, a first compartment for a standard soldering bobbin, and a second compartment for the controller and preferably provided on a circuit board, and containing a soldering wire-feeding mechanism as described in the primary summary of the invention.

According to another aspect of the invention there is provided a device for metering of predetermined doses of a solder wire, in accordance with an operator's settings, comprising a channel for soldering wire; a friction roller mechanism adjacent said channel a plunger mechanism; a mover of soldering wire adjacent said channel; sensor(s) for soldering wire, and sensor(s) for a soldering iron, preferably wherein the channel for soldering wire is defined by of a plate and cover for said device. Preferably the plate has most of the soldering wire channel and the cover has the ridge, closing the channel after feeding soldering wire thereto.

Preferably said device accommodates use of soldering wire with different diameter.

According to yet another aspect of the invention there is provided a method of soldering utilizing the above-mentioned preferred automatic desktop soldering device comprises the following steps:

1) locating said soldering device on the top of a working desk a predetermined distance from the operator;
2) charging the bobbin with the appropriate spool of soldering wire for the task being performed;
3) ensuring the AC adapter has been plugged in and that the switch, preferably located on the case of the dispenser, has been turned to the ON position;
4) executing the first program step for the device including feeding, for example pulling the soldering wire from the bobbin into the dispenser;
5) setting the amount of soldering wire required for the task (dose) in advance as determined by the operator or alternatively by the task setting;
6) reversing the direction of the soldering wire in the a direction opposite from the feeding direction to the operator, until the remote free end of the soldering wire is a predetermined distance from a sensing point so as to establish the requisite length of soldering wire, as defined in advance by step 5
7) waiting in stand-by mode as the soldering dispenser awaits for the operator to acquire a dose of a soldering wire with a soldering iron from the device;
8) retracting the end of a soldering wire back into the dispenser to establish the predetermined reference position of step 6;
9) repeating the soldering steps as required until the end of the job;
10) changing the spool located on the bobbin and proceeding with another soldering task by repeating steps 2 onwards or shutting down the device.

According to yet another aspect of the invention there is provided a method of metering out precise doses of soldering wire and comprising the steps of:

moving the soldering material back from an operator and passing by a sensor(s) in order to find the end of a soldering wire;

reversing the direction of the movement of the soldering wire towards an operator and counting the time interval (s), during which the end of the soldering wire passes by the neighboring sensor(s);

calculating the time duration of soldering wire mover's activities, by using the results of the previous step as well as the operator's settings;

moving the soldering wire towards an operator, in accordance with the calculated period of time, starting to count-down at the moment when the end of the soldering wire passes a designated sensor;

keeping unmoved the soldering material until the moment when appropriate sensor(s) will register that an operator has picked up, by the means of soldering iron, the previously determined dose of the soldering wire; starting the cycle of metering a soldering wire again.

Preferably an equal-step mover (step-motor) for the soldering wire is utilized, and the results of calculation for number of steps for the predetermined distance between adjacent sensors as well as the operator's settings are used for metering of precise doses of the soldering wire.

Preferably the known-in-advance information about wire length-per-step is used for metering of precise doses of the soldering wire as well as the operator's settings.

Preferably an equal-step mover (step-motor) for the soldering wire and only one sensor for soldering wire is used and metering of precise doses of soldering wire based on known in advance information about wire length required per step and counting number of steps beginning from the moment when the wire's end crosses the sensor.

BRIEF DESCRIPTION OF THE DRAWINGS

The present construction of the preferred embodiment of the invention and its mode operation, together with additional objects and advantages thereof, will be best understood from the following appended drawings and the description of preferred embodiment following.

IN THE DRAWINGS

Figure 1:
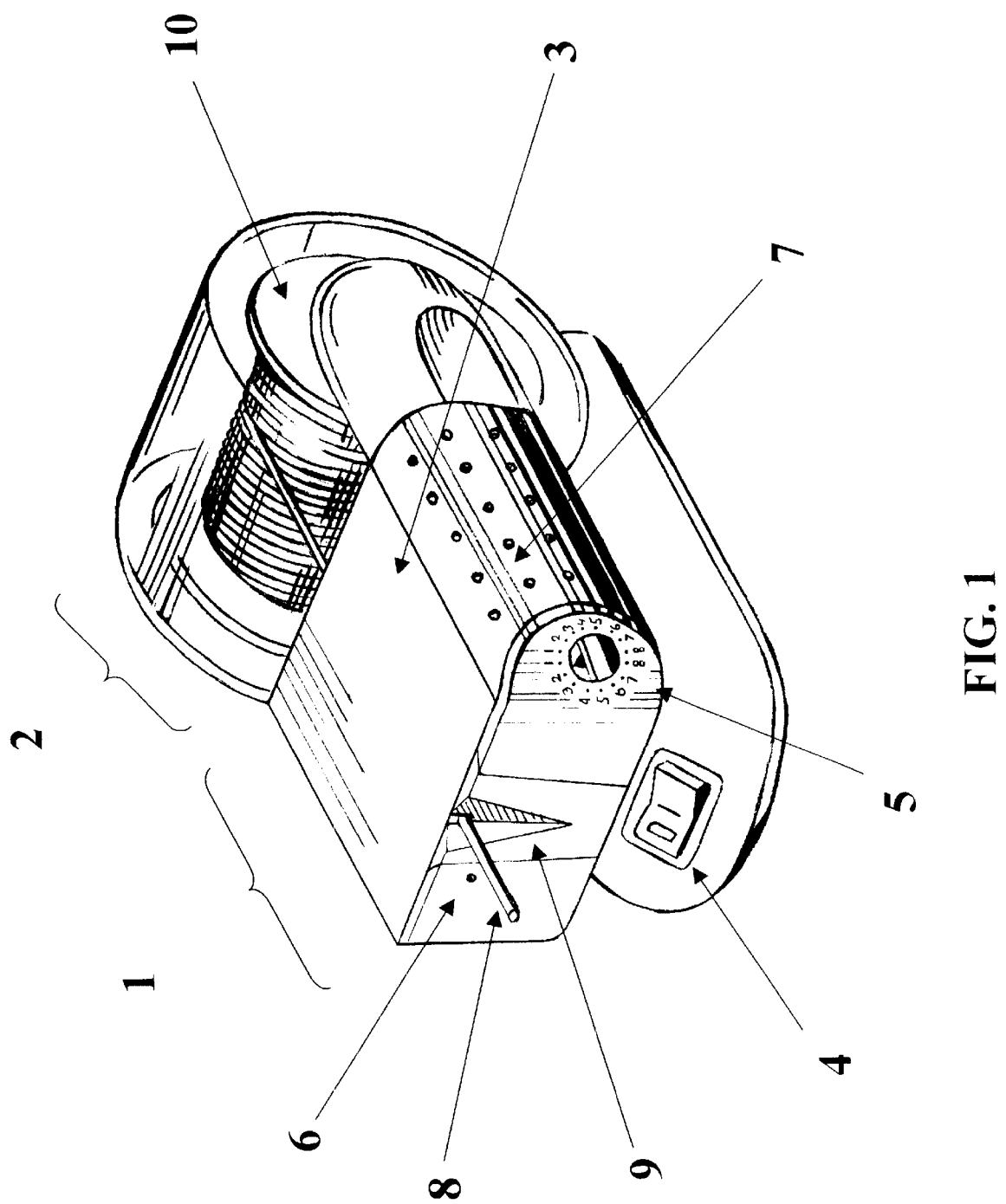

FIG. 1 is a perspective view of a desk-top soldering dispenser with automatic metering and feeding of soldering wire illustrated in a preferred embodiment of the invention.

Figure 2:
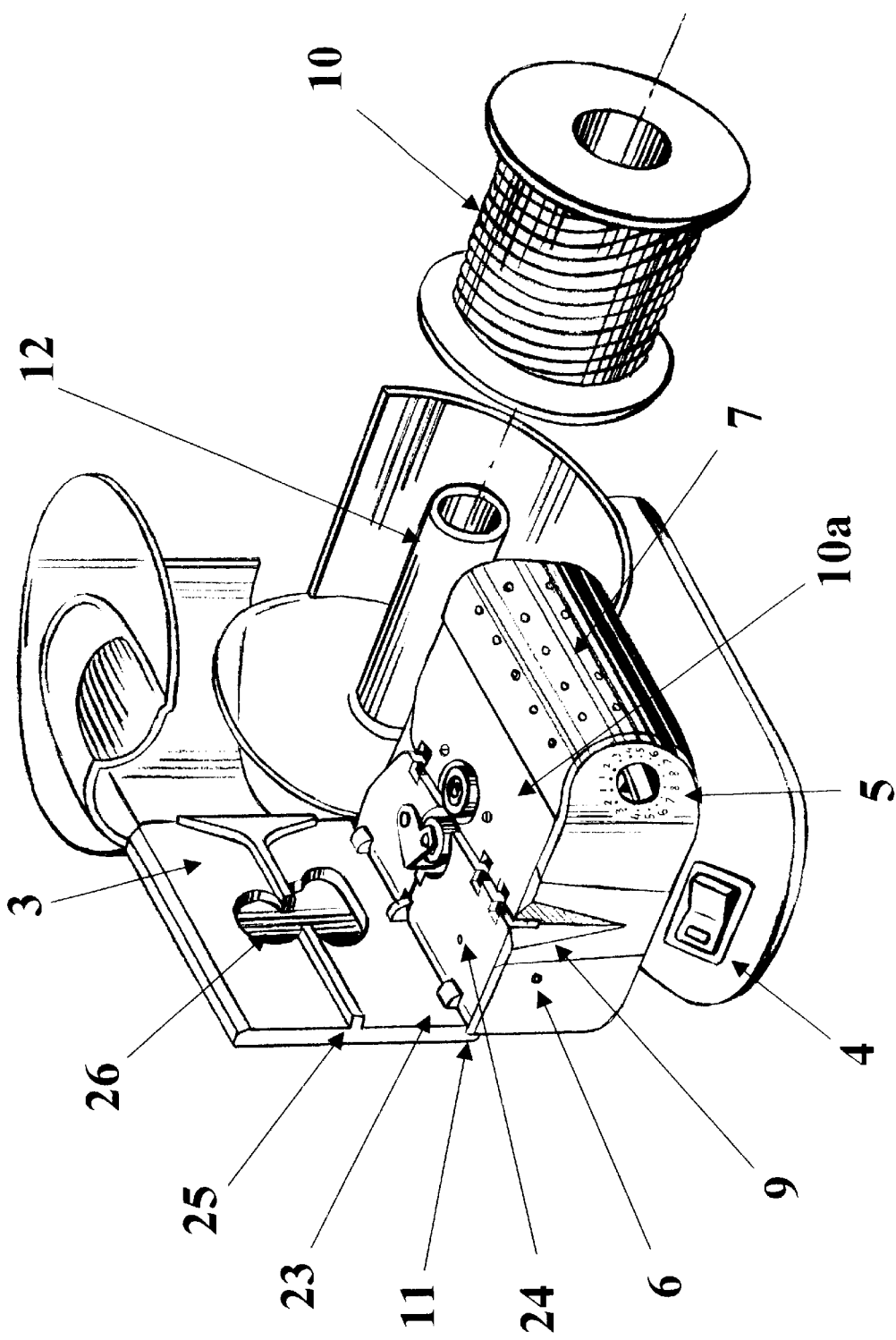

FIG. 2 is a perspective view of the desk-top soldering dispenser of FIG. 1 illustrated with an open cover showing the feeding mechanism and compartment for a bobbin of soldering wire and illustrated in a preferred embodiment of the invention.

Figure 3:
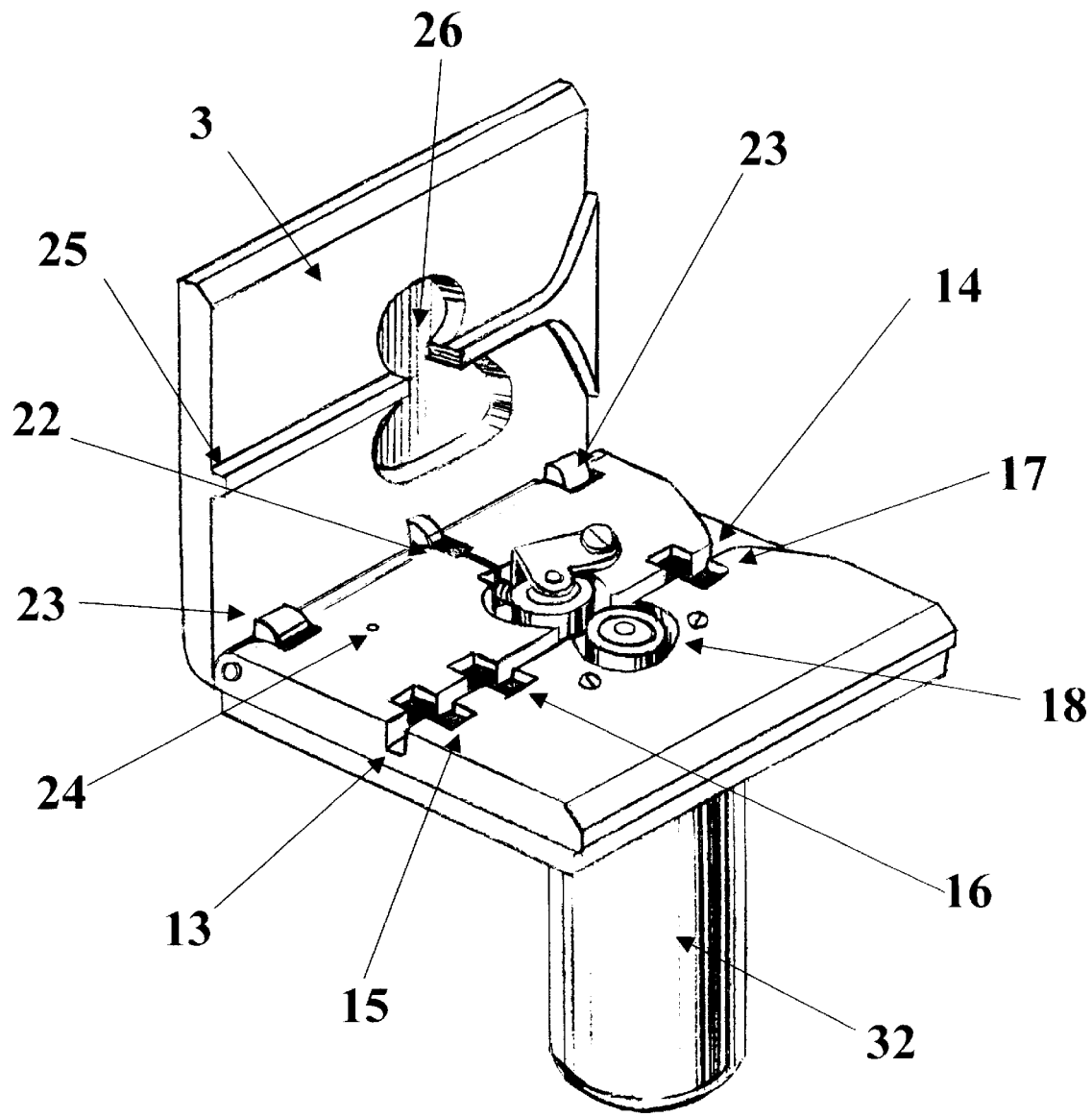

FIG. 3 is a perspective view of the soldering wire feeding mechanism of FIG. 1 and 2 with the plastic case removed.

Figure 4:
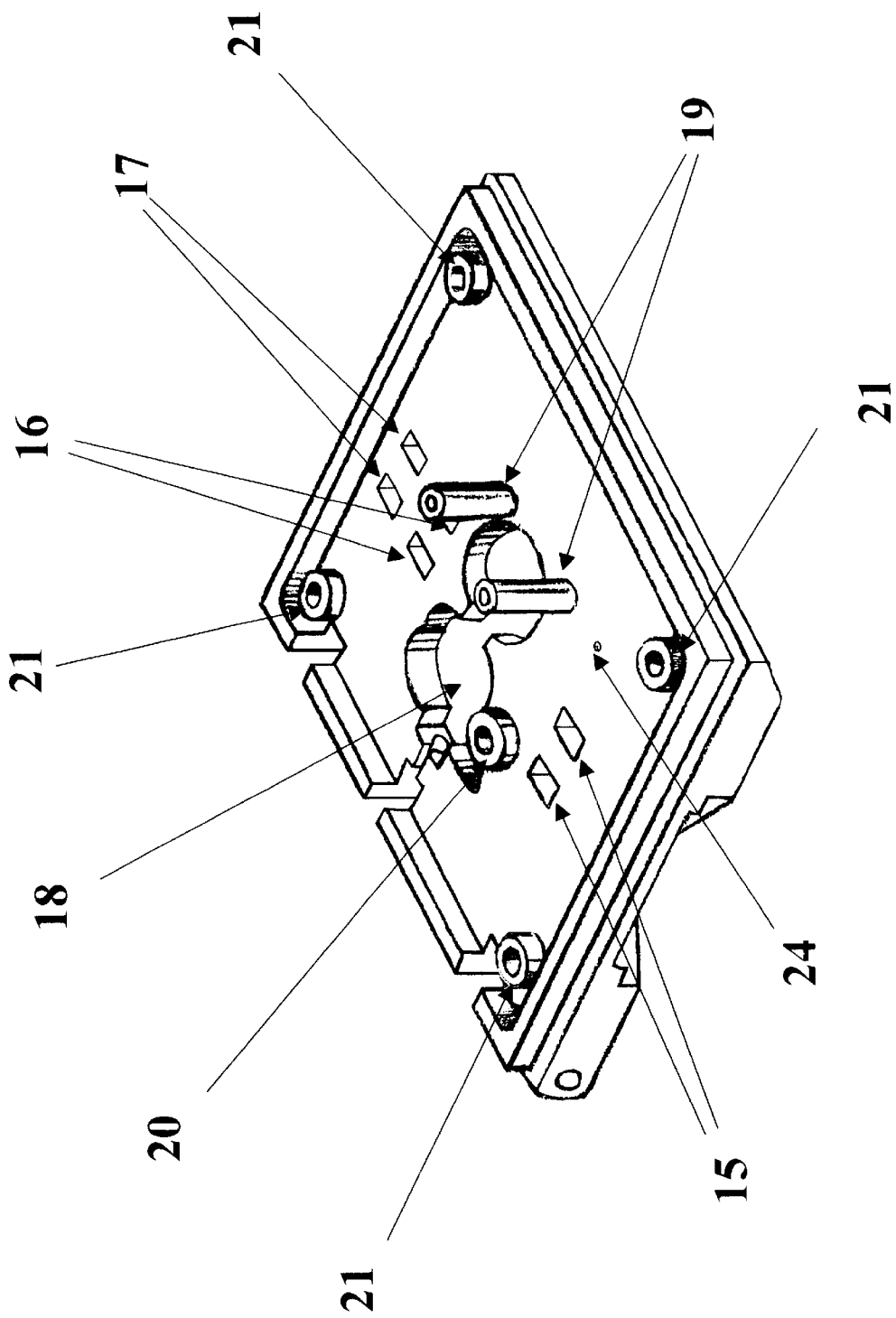

FIG. 4 is a partial perspective view of the device of FIG. 1 illustrating certain parts of the soldering wire feeding mechanism disposed on top of the printed circuit board and illustrated in a preferred embodiment of the invention.

Figure 5:
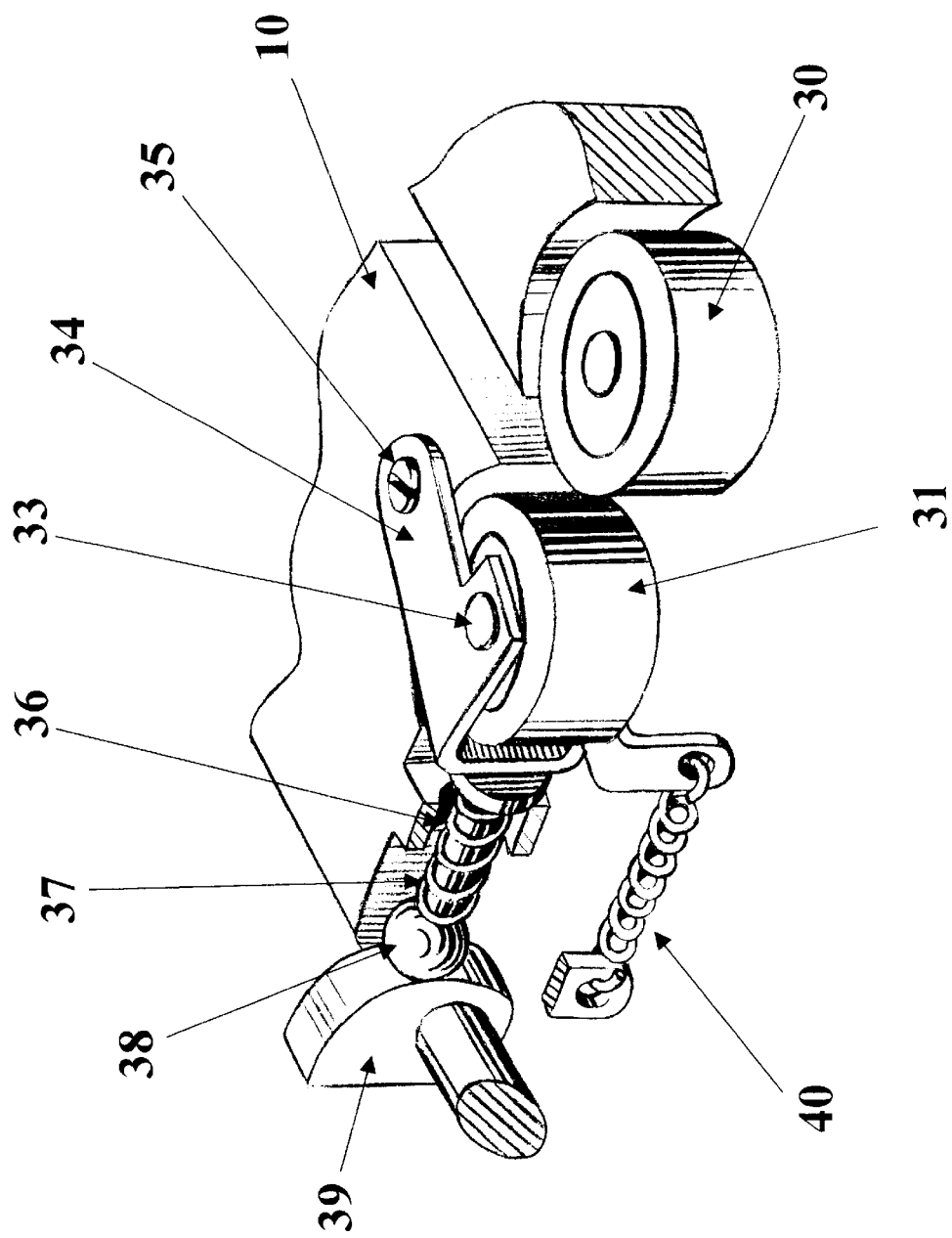
Figure 6:
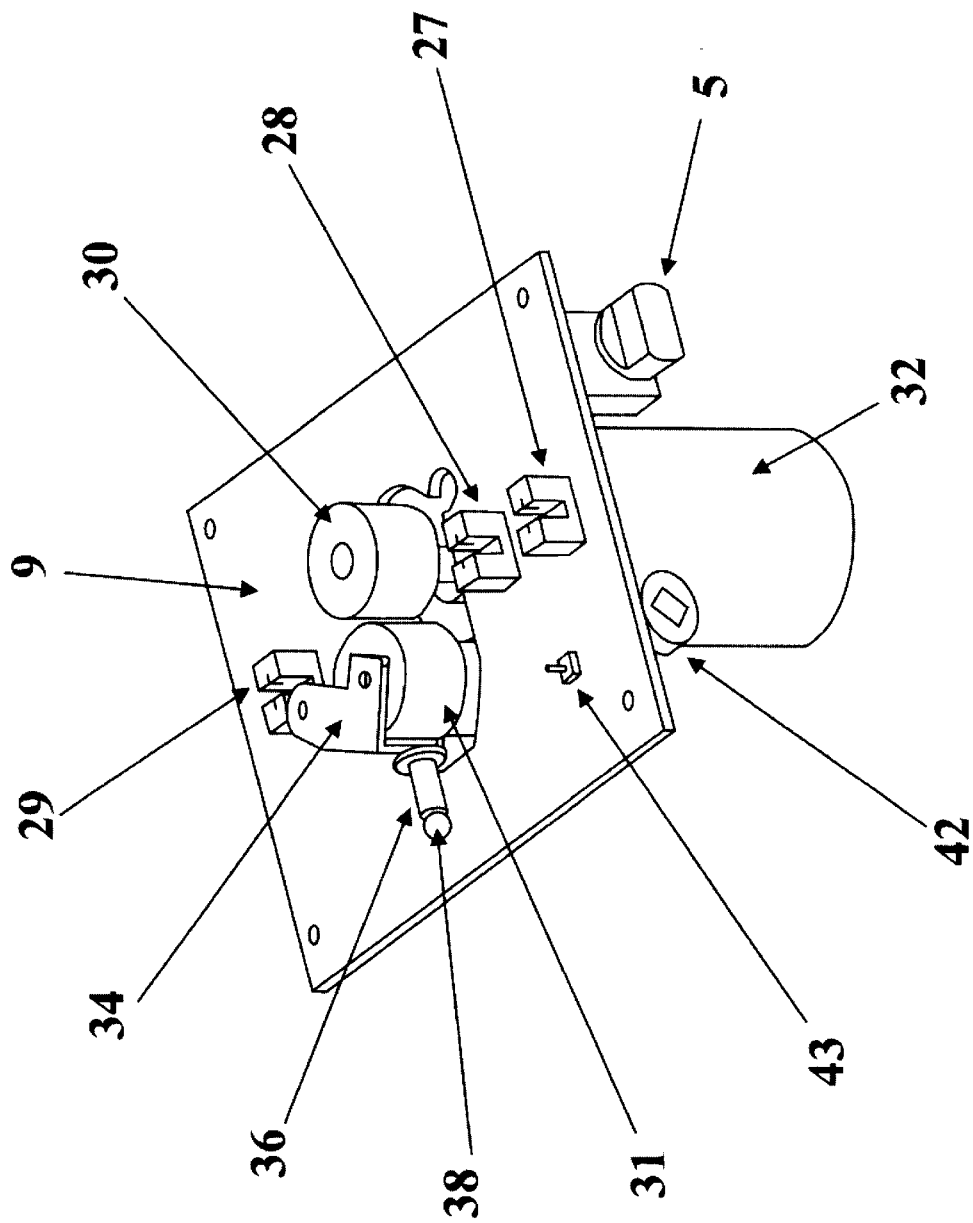

FIG. 5 and 6 are perspective views of the mechanical components of the wire feeding mechanism of FIG. 1 illustrated in a preferred embodiment of the invention.

Figure 7:
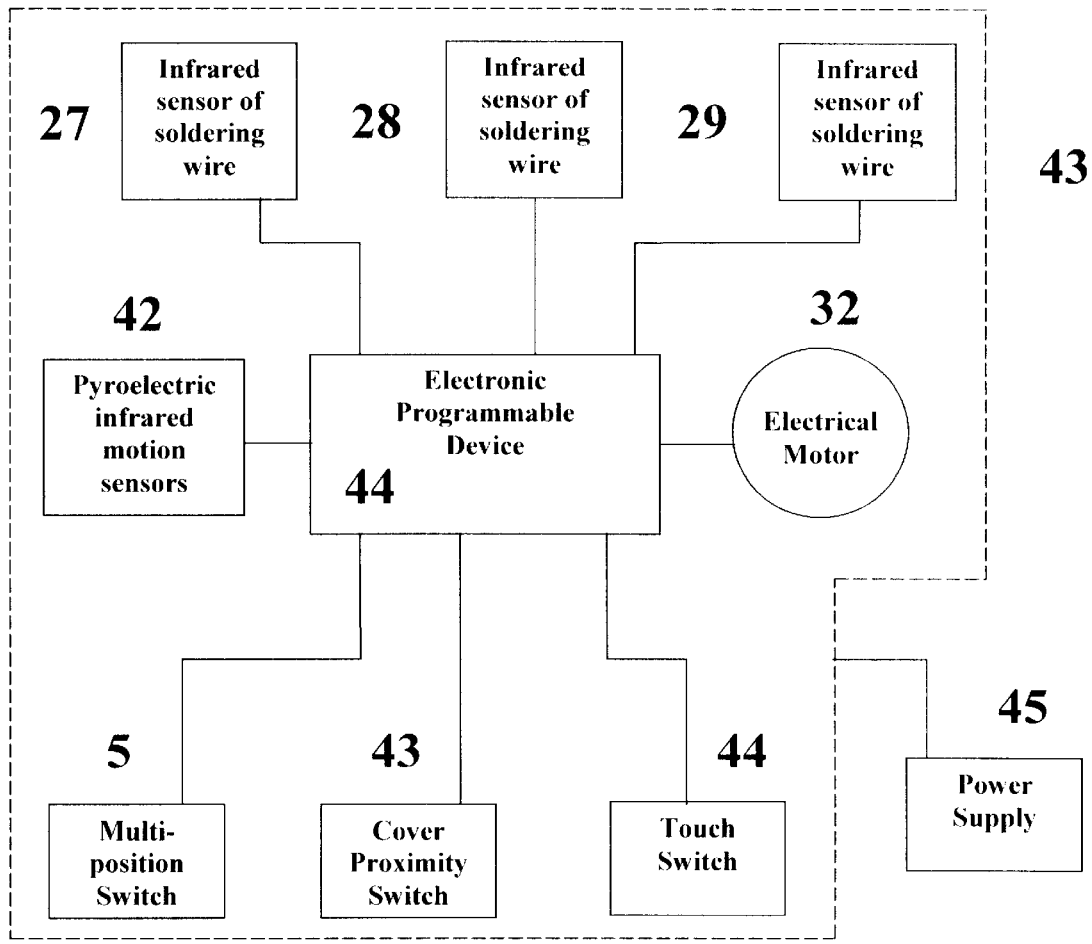
Figure 8:
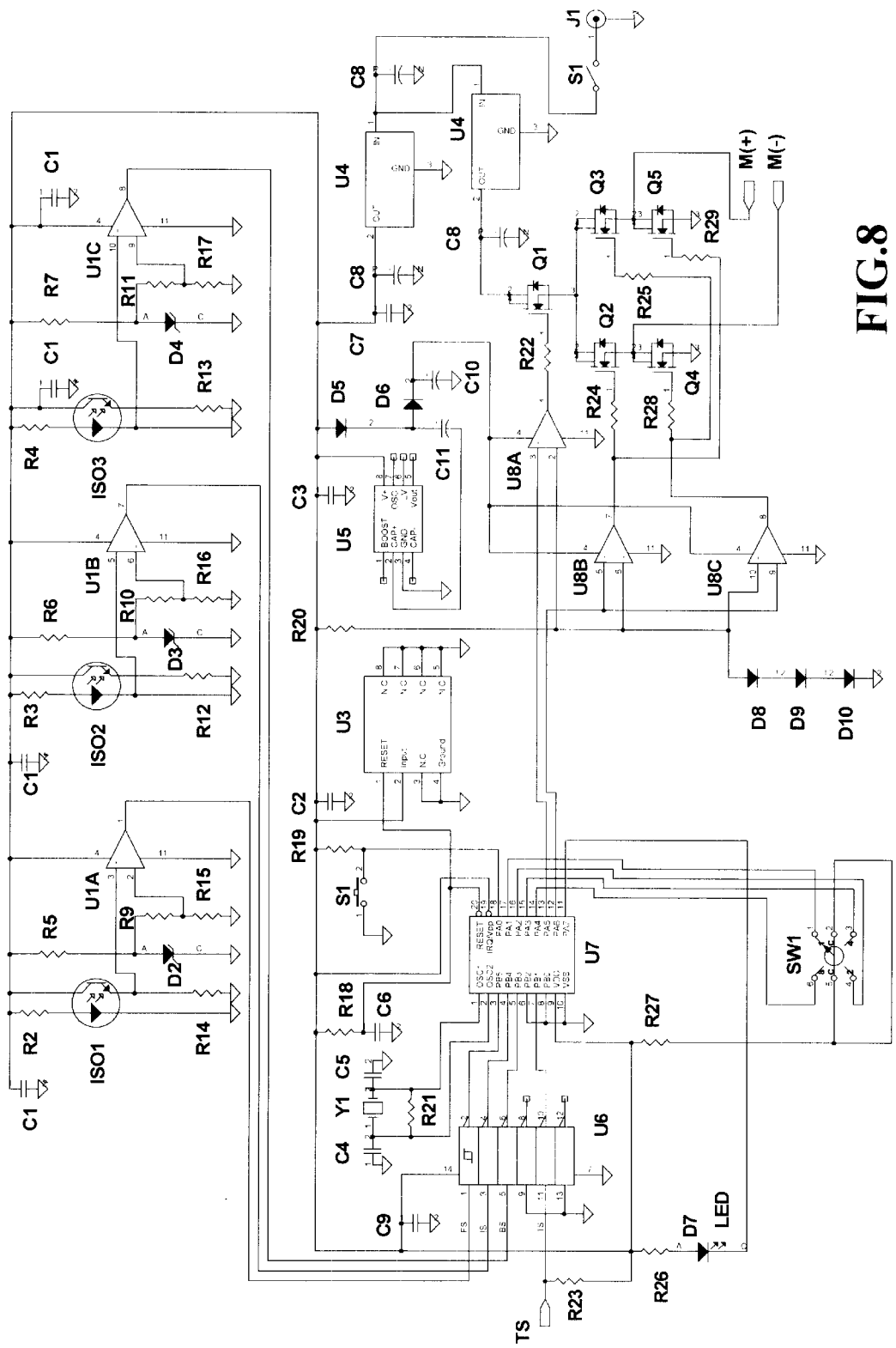

FIG. 7 is a block diagram of the method carried out by the preferred embodiment of the invention FIG. 8 is a electrical circuit schematic diagram of the automatic desktop soldering dispenser.

DESCRIPTION OF THE PREFERRED EMBODIMENTS

The compact desktop soldering dispenser of FIG. 1 has an ergonomically shaped body for ease of operator use. The dispenser consists of the front compartment 1, compartment for a bobbin of soldering wire 2, the dispenser cover 3, the power ON/OFF switch 4, the multi-position switch 5 and the thermal sensor window 6. For convenience of transportation within a working space, the dispenser is provided with contoured shaped sides 7. Delivery of the soldering wire 8 to an operator occurs through the Teflon shield 9, which allows easier pickup of small doses of soldering wire by the soldering iron's kern. The front compartment 1 consists of the entire mechanism for delivering a soldering wire dosage amount to an operator and the second compartment 2 is designated for a standard bobbin of soldering wire 10 from which the dose is indexed.

The perspective view of the soldering wire feeding mechanism shown in FIG. 2 illustrating two major parts: the base frame plate 10a and the cover 3 jointed by common axes 11. The cover 3 is rotated from a closed position to an open position disposed at 90° to the closed position in order to have convenient access to the base frame plate 10 and insert or extract e bobbin of soldering wire from support pin 12.

The base frame plate 10 of FIG. 3 comprises the soldering wire channel 13 with expansion mouth 14, the specially shaped pockets or windows 15, 16, 17 and 18. As best seen in FIG. 4 the stand offs 19, 20 and 21, are located on opposite side of the wire channel 13. Tunnel 22, engages the hinge elements 23 with the cover plate 3, and the hole 24 of the cover proximity sensor. The cover 3 contains the bar 25 and the cavity 26.

The soldering wire channel 13 will accommodate soldering wire 8 with various diameters. The expansion mouth 14 allows easier access to the soldering wire 8 from the bobbin 10. The pockets or windows 15, 16, 17 are provided to accommodate the soldering wire sensors 27, 28 and 29 as best seen in FIG. 6.

The window 18 of FIG. 4 accommodates the roller mechanism 30/31 of FIG. 5 namely grooved friction rollers 30 and 31, between which the soldering wire 8 is guided. The roller 30 sits on the axis of the electrical motor 32, of FIG. 6, which is attached to the base frame plate through stand off 19. The idle friction roller 31 sits on the axes 33, located inside of the frame 34. At the same time the frame 34 has the joint axes connection 35 with the base frame plate 10 using the stand off 20. When the cover 3 is closed this action pushes a pin of the cover proximity switch located in hole 24. The stands off 21 are designated to accommodate the electronic circuit board 41.

The tunnel 22 has special shape and designated to accommodate the plunger mechanism of FIG. 5. The plunger mechanism comprises the plunger 36, spring 37 and ball 38. The major role of the plunger mechanism is to push the idle friction roller 31 towards the roller 30, when the cover 3 is closed. A gap between two rollers is required when the cover 3 is in the open position. For this purpose the cover 3 comprises the cam shaped ridge 39 and returning spring 40. The cover plate 3 includes the bar 25, which locks the soldering wire channel 13 with expansion mouth 14 and the cavity 26 designed to accommodate the friction roller mechanism. The compartment 2 for the bobbin of soldering wire 10, as the part of the cover 3, is made from a transparent plastic to enable the operator to easily determine when the bobbin 10 is running out of wire.

The compartment 2 consists of the bobbin pin 12, located and in combination with the shape of the cover 3 allows convenient access for a bobbin replacement.

A more detailed view of the feeding mechanism and electronic board 31 without the base frame plate 9 is shown on FIG. 6. The electronic board 41 is located under the base plate 9 and comprises the infrared soldering wire sensors 28, 29 and 30, pyro-electric infrared motion sensors 42, cover proximity switch 43 and most of the electronic components, including the multi-position switch 5 of soldering material doses.

The FIG. 7 schematic logic block-diagram of the preferred embodiment and consists of the infrared sensors of soldering wire 27, 28 and 29, pyroelectric infrared motion sensors 42, electronic programmable device 44, electrical motor 32, multi-position switch 5, cover proximity switch 43 and touch switch 44, all located on the electronic circuit board 31. DC current is provided by a separate power supply 45.

FIG. 8 presents the electrical circuit schematic of preferred embodiment of the desktop dispenser of soldering wire.

The preferred manner of operation of the compact desktop soldering wire dispenser, which references to FIG. 1, 2 and 3, is as follows:

The device is plugged in to AC current through a wall adapter.

In order to charge the compact desktop soldering dispenser with a soldering wire, the cover 3 is opened, by rotating it 90° into the vertical position. This action will release the friction roller mechanism by means of spring 40, cam shaped ridge 39, plunger 36 and ball 38, which accordingly will release the frame 34 from the friction roller 31 and provide access to the soldering wire channel 13. At the same time access to bobbin compartment 2 is provided.

The open cover 3 will release proximity cover sensor 43, therefore sending the logic command "STOP" to the programmable device 44. The desired spool 10 of soldering wire 8 is placed on the bobbin pin 12 and soldering wire 8 is subsequently fed into the soldering wire channel 13 in such a manner that leaves the free end visible to an operator after closing of cover 3.

After closing the cover 3 the roller mechanism 30/31 is activated and idle friction roller 31 together with drive roller 30 index the soldering wire 8 an operator accessible position.

Program of the programmable device 44 and an operator's setting of the multi-position switch 5 will define all the necessary steps.

As many changes can be made to the preferred embodiments without departing from the scope thereof; it is considered that all matter contained herein is illustrative of the invention but not in a limiting sense.

The embodiments of the invention in which an exclusive property or privilege is claimed are as follows:

1. A method of metering out precise doses of soldering wire and comprising the steps of:
   moving the soldering material back from an operator and passing by a sensor(s) in order to find an end of a soldering wire;
   reversing a direction of movement of the soldering wire towards an operator and counting a time interval(s), during which the end of the soldering wire passes by neighboring sensor(s);
   calculating a time duration of the soldering wire mover's activities, by using the results of the previous step as well as an operator's settings;
   continue moving the soldering wire towards an operator, in accordance with the calculated period of time from the previous step;
   keeping unmoved the soldering material until a moment when appropriate sensor(s) will register that an operator has picked up, by means of soldering iron, a previously determined dose of the soldering wire;
   starting a cycle of metering a soldering wire again.

2. A method according to claim 1, where an equal-step mover of the soldering wire is used, and results of calculation of number of steps between adjacent sensors as well as the operator's settings are used for metering of precise doses of the soldering wire.

3. A method according to claim 2, where known-in-advance information about wire length-per-step is used for metering of precise doses of the soldering wire as well as the operator's settings.

4. A method according to claim 2, where an equal-step mover of the soldering wire and only one sensor of soldering wire is utilized wherein metering of precise doses of soldering wire is based on known in advance information about a required wire length-per-step and further counting a number of steps beginning from a moment when the wire's end crosses the sensor.

5. A device for metering of a predetermined amount of soldering wire, in accordance with an operator's settings, comprising dosing means for solder wire, including a channel for soldering wire; a friction roller mechanism; a plunger mechanism; a mover of soldering wire; sensors of soldering wire, and sensors for a soldering iron.

6. A device according to claim 5, where the channel of soldering wire is created by two parts, a plate and cover, said plate forming most of the soldering wire channel and the cover having a ridge, closing the channel when placing a soldering wire therein.

7. A device according to claim 5, which allowing use of soldering wire with different diameters.

8. A device for metering a precise dose of soldering material to an operator, said device comprising a controller for controlling a supply of at least one continuous length of soldering material, said device having at least one soldering material passage for feeding a supply of at least one continuous length of soldering material to the operator, said passage having drive means disposed adjacent thereto for driving the continuous filament of material from the supply through said passage towards the operator, said passage further having in association therewith at least one sensor for monitoring a position of the free end of said supply of at least one continuous length of soldering material, said soldering material exiting said passage and a channel proximate a mouth adjacent a position for an operator, said device having said controller, a microprocessor, in communication with said at least one sensor and for measuring the dose advanced to the operator, said device also having an operator dose selecting means, for a precise dose range depending on a job being done, wherein said device provides to the operator an automatic hands free manner of acquiring a precise dose or fixed amount of soldering material of various diameters for the job to be done.

9. The device of claim 8 wherein said soldering material is disposed in a coil and on a spool.

10. The device of claim 8 wherein said passage is a channel.

11. The device of claim 8 wherein said drive means is either an electric, motor having a predetermined speed or a stepped motor capable of being driven in stepped increments.

12. The device of claim 8 wherein said at least one sensor is at least one optical sensor.

13. The device of claim 8, 10, 11 or 12 having three optical sensors disposed adjacent said passage and the channel for sensing, the position of the free end of said supply of at least one continuous length of soldering material, the amount to be supplied to the operator, and for sensing when the supply of at least one continuous length of soldering material is depleted, and for determining a feed rate for the soldering material.

14. The device of claim 8 wherein said mouth has a coated surface and a notch adjacent said mouth to provide heat resistance to a tip of a soldering tool.

15. The device of claim 8 wherein said device also has a sensor adjacent the mouth for determining when a soldering tool tip has acquired a dose of soldering material.

16. The device of claim 13 wherein said device also has a sensor adjacent the mouth for determining when a soldering tool tip has acquired a dose of soldering material.

17. The device of claim 8 or 15 wherein said sensor adjacent said mouth is a pyroelectric infrared motion sensor which detects a heat of a soldering tool and based on a predetermined time delay will provide feedback to the device controller and preferably a microprocessor to activate the drive means to provide a second dose of soldering material.

18. The device of claim 17 wherein said feedback may alternatively be an electronic sensor to sense an electrical condition such as a positive charge or an electrical grounding condition when the tip acquires the precise predetermined dose.

19. The device of claim 18 wherein said electrical sensor is a chip including at least one transistor which changes electrical state based on the soldering tool tip touching the soldering material.

20. The device of claim 13 wherein the drive means and a motor is stepped a predetermined amount to advance a predetermined dose or based on calculating the time required for the filament to be advanced by a fixed speed motor from the sensor sensing the free end of the soldering filament to the sensor adjacent the mouth of the device thereby determining the time the motor must operate by considering a fixed distance between the sensors and a velocity of feed of the soldering material thereby determining a time and by advancing the motor a predetermined amount defined by a technician selectable setting.

21. The device of claim 8 wherein in addition there is provided a second range for a fixed amount of material to be advanced to the operator which based on a skill of the operator may only be partially consumed.

22. The device of claim 8 further comprising a portable or alternatively a desk top device which may be located proximate the operator.

* * * * *